(12) United States Patent
Gawande et al.

(10) Patent No.: US 11,628,844 B2
(45) Date of Patent: *Apr. 18, 2023

(54) SYSTEM AND METHOD FOR PROVIDING VEHICLE SAFETY DISTANCE AND SPEED ALERTS UNDER SLIPPERY ROAD CONDITIONS

(71) Applicant: Volvo Car Corporation, Gothenburg (SE)

(72) Inventors: Saurabh Gawande, Gothenburg (SE); Srikar Muppirisetty, Mölndal (SE); Sohini Roy Chowdhury, Santa Clara, CA (US); Minming Zhao, Mountain View, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,600

(22) Filed: Sep. 15, 2021

(65) Prior Publication Data
US 2022/0001873 A1 Jan. 6, 2022

Related U.S. Application Data

(63) Continuation of application No. 16/728,024, filed on Dec. 27, 2019, now Pat. No. 11,124,193, which is a
(Continued)

(51) Int. Cl.
*B60W 40/068* (2012.01)
*B60W 50/14* (2020.01)
(Continued)

(52) U.S. Cl.
CPC .......... *B60W 40/068* (2013.01); *B60W 30/09* (2013.01); *B60W 30/14* (2013.01);
(Continued)

(58) Field of Classification Search
CPC .... B60W 40/068; B60W 30/09; B60W 30/14; B60W 50/14; B60W 60/0015;
(Continued)

(56) References Cited

U.S. PATENT DOCUMENTS

| 6,445,153 B1 | 9/2002 | Sielagoski |
| 9,139,204 B1 | 9/2015 | Zhao et al. |

(Continued)

FOREIGN PATENT DOCUMENTS

| EP | 2698299 A1 | 2/2014 |
| EP | 3299993 A1 | 3/2018 |

(Continued)

OTHER PUBLICATIONS

Sep. 20, 2019 European Search Report issued for International Application No. EP19170536.
(Continued)

*Primary Examiner* — Casey L Kretzer
(74) *Attorney, Agent, or Firm* — Clements Bernard Walker; Christopher L. Bernard

(57) ABSTRACT

Vehicle alert and control systems and methods taking into account a detected road friction at a following vehicle and a predicted road friction by the following vehicle. The detected road friction between the following vehicle tires and the road surface may be assessed using a variety of methodologies and is used to compute a critical safety distance between the following vehicle and the preceding vehicle and a critical safety speed of the following vehicle. The predicted road friction ahead of the following vehicle may also be assessed using a variety of methodologies (lidar, camera, and cloud-based examples are provided) and is used to compute a warning safety distance between the following vehicle and the preceding vehicle and a warning safety speed of the following vehicle. These functionalities may be
(Continued)

applied to vehicle/stationary object warning and response scenarios as well.

20 Claims, 6 Drawing Sheets

Related U.S. Application Data continuation-in-part of application No. 16/541,264, filed on Aug. 15, 2019, and a continuation-in-part of application No. 15/969,973, filed on May 3, 2018, now Pat. No. 10,706,294.

(51) Int. Cl.
*B60W 30/14* (2006.01)
*B60W 30/09* (2012.01)
*B60W 60/00* (2020.01)
*G06V 20/56* (2022.01)

(52) U.S. Cl.
CPC ........ *B60W 50/14* (2013.01); *B60W 60/0015* (2020.02); *G06V 20/56* (2022.01); *B60W 2050/143* (2013.01); *B60W 2050/146* (2013.01); *B60W 2552/40* (2020.02)

(58) Field of Classification Search
CPC ..... B60W 2050/143; B60W 2050/146; B60W 2552/40; G06V 20/56
See application file for complete search history.

(56) References Cited

U.S. PATENT DOCUMENTS

| | | | |
|---|---|---|---|
| 9,188,981 B2 | 11/2015 | Israelsson | |
| 9,333,971 B1 | 5/2016 | Han | |
| 9,453,941 B2 | 9/2016 | Stainvas Olshansky | |
| 9,598,087 B2 | 3/2017 | Zhao et al. | |
| 2010/0020170 A1 | 1/2010 | Higgins-Luthman et al. | |
| 2015/0151750 A1* | 6/2015 | Tsuchiya | B62D 7/159 701/41 |
| 2015/0166072 A1 | 6/2015 | Powers et al. | |
| 2015/0178572 A1 | 6/2015 | Omer | |
| 2015/0224925 A1 | 8/2015 | Hartmann | |
| 2015/0251659 A1* | 9/2015 | Fischer | B60T 8/171 382/104 |
| 2015/0371095 A1 | 12/2015 | Hartmann et al. | |
| 2016/0133131 A1* | 5/2016 | Grimm | G08G 1/0112 701/117 |

FOREIGN PATENT DOCUMENTS

| | | | |
|---|---|---|---|
| JP | 2004280339 A | 10/2004 | |
| JP | 3817611 B2 | 9/2006 | |
| WO | 2013173911 A1 | 11/2013 | |
| WO | 2017053415 A1 | 3/2017 | |
| WO | 2017068743 A1 | 4/2017 | |
| WO | 2018054910 A2 | 3/2018 | |

OTHER PUBLICATIONS

Han et al., Development of Autonomous Emergency Braking Control System Based on Road Friction, 2014 IEEE International Conference on Automation Science and Engineering (CASE) Taipei, Taiwan, Aug. 18-22, 2014.

Hong et al., Advanced Smart Cruise Control with Safety Distance Considered Road Friction Coefficient, International Journal of Computer Theory and Engineering, vol. 8, No. 3, Jun. 2016.

Moon et al., Design, Tuning and Evaluation of Integrated ACC/CA Systems, Proceedings of the 17th World Congress, The International Federation of Automatic Control, Jul. 6-11, 2008.

Moran, Automotive News, On the Road: Smart Cruise Control Smoothes Traffic, Oct. 29, 2007.

* cited by examiner ds= safety distance
ds = (v*v)/(2*g)
d= distance to the target
v= ego velocity
g= gravitational constant
mu_ds= safety distance w/ friction coeff mu
mu_ds= (v*v)/(2*f (µd , µp)*g)

SYSTEM AND METHOD FOR PROVIDING VEHICLE SAFETY DISTANCE AND SPEED ALERTS UNDER SLIPPERY ROAD CONDITIONS

CROSS-REFERENCE TO RELATED APPLICATIONS

The present disclosure is a continuation of U.S. patent application Ser. No. 16/728,024, filed on Dec. 27, 2019, and entitled "SYSTEM AND METHOD FOR PROVIDING VEHICLE SAFETY DISTANCE AND SPEED ALERTS UNDER SLIPPERY ROAD CONDITIONS," which is a continuation-in-part of U.S. application Ser. No. 15/969,973, filed on May 3, 2018, which is now a U.S. Pat. No. 10,706,294, issued on Jul. 7, 2020 and entitled "METHODS AND SYSTEMS FOR GENERATING AND USING A ROAD FRICTION ESTIMATE BASED ON CAMERA IMAGE SIGNAL PROCESSING," and U.S. patent application Ser. No. 16/541,264, filed on Aug. 15, 2019, and entitled "VEHICLE SYSTEMS AND METHODS UTILIZING LIDAR DATA FOR ROAD CONDITION ESTIMATION," the contents of all of which are incorporated in full by reference herein.

TECHNICAL FIELD

The present disclosure relates generally to the automotive field. More particularly, the present disclosure relates to a system and method for providing vehicle safety distance and speed alerts under slippery road conditions.

BACKGROUND

Various automotive manufacturers are currently developing and providing advanced driver assistance system (ADAS) and autonomous driving (AD) functionalities, such as safety distance and speed alerts, adaptive cruise control (ACC), and forward collision warning and response. These active safety features identify and track both static obstacles and active targets using different sensor modalities, such as radar, lidar, and cameras. The active safety features are functional and effective as long as road surface conditions are good. However, once the road surface conditions are compromised, by heavy rain, snow, or the like, the active safety features are rendered essentially ineffective, as they do not typically take into account extreme weather conditions and the road surface conditions.

Thus, what is still needed in the art is an active safety system and method that is robust and incorporates the consideration of road surface condition into a safety distance and speed alert, ACC, and/or forward collision warning and response scheme, providing enhanced warning information to a driver and/or active control to a vehicle.

SUMMARY

Various driver warning information and ACC and pilot assist (PA) functions currently available promote the driver or vehicle maintenance of a safe distance and speed between a following vehicle and a preceding vehicle, for example, by, at the following vehicle, calculating the speed of the preceding vehicle, the speed of the following vehicle, and the distance between the following vehicle and the preceding vehicle. Again, such calculations are performed using one or more onboard sensors and/or cameras, as well as an onboard and/or cloud-based processing system. The present disclosure supplements these calculations by utilizing information, such as a detected road friction at the following vehicle and a predicted road friction by the following vehicle. The predicted road friction may be based on local observations and/or cloud-based observations obtained from other vehicles. The detected road friction between the following vehicle tires and the road surface may be assessed using a variety of methodologies and is used to compute a critical safety distance between the following vehicle and the preceding vehicle and a critical safety speed of the following vehicle. The predicted road friction ahead of the following vehicle may also be assessed using a variety of methodologies (lidar, camera, and cloud-based examples are provided) and is used to compute a warning safety distance between the following vehicle and the preceding vehicle and a warning safety speed of the following vehicle. These functionalities may of course be applied to vehicle/stationary object warning and response scenarios and the like as well.

Thus, while most conventional systems and methods rely on longitudinal velocity control mechanisms for the initiation of vehicle throttle and braking controls in detected scenarios, the present disclosure utilizes machine learning (ML) models to detect the road friction or road surface condition beneath a vehicle and predict the road friction or road surface condition ahead of a vehicle—thereby improving vehicle warning and response systems related to other vehicles, obstacles, and the like. The result is increased accuracy of and confidence in determined critical and warning safety distances and speeds.

In one exemplary embodiment, the present disclosure provides a system for determining and utilizing vehicle safety distance and speed information based on detected and predicted friction information, the system including: a road condition module configured to receive and formulate detected road friction data from one or more on-board vehicle sensors related to detected road friction in the proximity of a vehicle and predicted road friction data from one or more vision/perception vehicle sensors related to predicted road friction ahead of the vehicle; a safety distance/speed module configured to determine one or more of a safety distance, a safety speed, a warning distance, and a warning speed of the vehicle with respect to another vehicle or an object taking into account the detected road friction data and the predicted road friction data; and one or more of: (1) a driver alert system configured to present the one or more of the safety distance, the safety speed, the warning distance, and the warning speed to a driver of the vehicle or alert the driver if the safety distance or the warning distance has been breached or the safety speed or the warning speed has been exceeded and (2) a vehicle control system configured to alter automated operation of the vehicle based on one or more of the safety distance, the safety speed, the warning distance, and the warning speed. The one or more on-board vehicle sensors include a sensor configured to detect wheel/road friction. The one or more vision/perception vehicle sensors include one or more of a camera sensor, a radar sensor, and a lidar sensor. The safety distance is determined using the following equation:

$$D_s = v^2/(2 \ast g \ast f(\mu_d, \mu_p)),$$

where v is the vehicle velocity, g is the gravitational constant, $\mu_d$ is the detected road friction, and $\mu_p$ is the predicted road friction, incorporating a determined function (f) based on $\mu_d$ and $\mu_p$. The safety speed is a maximum speed allowable to stop the vehicle within the determined safety distance. The warning distance is determined using the following equation:

$$D_w = v^2/(2*a*f(\mu_p)),$$

where v is the vehicle velocity, a is the maximum acceleration/deceleration of the vehicle, and µp is the predicted road friction, incorporating a determined function (f) based on $\mu_p$. The warning speed is a chosen speed close to the safety speed within a given margin. The vehicle control system is configured to alter automated operation of one or more of the adaptive cruise control system, the autopilot system, the collision avoidance system, and the autonomous driving system of the vehicle based on one or more of the safety distance, the safety speed, the warning distance, and the warning speed. The road condition module is further configured to receive and formulate road friction data obtained from one or more of another vehicle and a cloud network.

In another exemplary embodiment, the present disclosure provides a method for determining and utilizing vehicle safety distance and speed information based on detected and predicted friction information, the method including: receiving and formulating detected road friction data from one or more on-board vehicle sensors related to detected road friction in the proximity of a vehicle and predicted road friction data from one or more vision/perception vehicle sensors related to predicted road friction ahead of the vehicle; determining one or more of a safety distance, a safety speed, a warning distance, and a warning speed of the vehicle with respect to another vehicle or an object taking into account the detected road friction data and the predicted road friction data; and one or more of: (1) presenting the one or more of the safety distance, the safety speed, the warning distance, and the warning speed to a driver of the vehicle or alerting the driver if the safety distance or the warning distance has been breached or the safety speed or the warning speed has been exceeded and (2) altering automated operation of the vehicle based on one or more of the safety distance, the safety speed, the warning distance, and the warning speed. The one or more on-board vehicle sensors include a sensor configured to detect wheel/road friction. The one or more vision/perception vehicle sensors include one or more of a camera sensor, a radar sensor, and a lidar sensor. The safety distance is determined using the following equation:

$$D_s = v^2/(2*g*f(\mu_d, \mu_p)),$$

where v is the vehicle velocity, g is the gravitational constant, $\mu_d$ is the detected road friction, and $\mu_p$ is the predicted road friction, incorporating a determined function (f) based on $\mu_d$ and $\mu_p$. The safety speed is a maximum speed allowable to stop the vehicle within the determined safety distance. The warning distance is determined using the following equation:

$$D_w = v^2/(2*a*f(\mu_p)),$$

where v is the vehicle velocity, a is the maximum acceleration/deceleration of the vehicle, and µp is the predicted road friction, incorporating a determined function (f) based on $\mu_p$. The warning speed is a chosen speed close to the safety speed within a given margin. The method further includes altering automated operation of one or more of the adaptive cruise control system, the autopilot system, the collision avoidance system, and the autonomous driving system of the vehicle based on one or more of the safety distance, the safety speed, the warning distance, and the warning speed. The method still further includes receiving and formulating road friction data obtained from one or more of another vehicle and a cloud network.

In a further exemplary embodiment, the present disclosure provides a non-transitory computer-readable medium including instructions stored in a memory and executed by a processor for determining and utilizing vehicle safety distance and speed information based on detected and predicted friction information, the instructions, when executed, performing the steps including: receiving and formulating detected road friction data from one or more on-board vehicle sensors related to detected road friction in the proximity of a vehicle and predicted road friction data from one or more vision/perception vehicle sensors related to predicted road friction ahead of the vehicle; determining one or more of a safety distance, a safety speed, a warning distance, and a warning speed of the vehicle with respect to another vehicle or an object taking into account the detected road friction data and the predicted road friction data; and one or more of: (1) presenting the one or more of the safety distance, the safety speed, the warning distance, and the warning speed to a driver of the vehicle or alerting the driver if the safety distance or the warning distance has been breached or the safety speed or the warning speed has been exceeded and (2) altering automated operation of the vehicle based on one or more of the safety distance, the safety speed, the warning distance, and the warning speed. The steps further include: altering automated operation of one or more of the adaptive cruise control system, the autopilot system, the collision avoidance system, and the autonomous driving system of the vehicle based on one or more of the safety distance, the safety speed, the warning distance, and the warning speed; and receiving and formulating road friction data obtained from one or more of another vehicle and a cloud network.

BRIEF DESCRIPTION OF THE DRAWINGS

The present disclosure is illustrated and described with reference to the various drawings, in which like reference numbers are used to denote like system components/method steps, as appropriate, and in which.

DESCRIPTION OF EMBODIMENTS

Again, various driver warning information and ACC and PA functions currently available promote the driver or vehicle maintenance of a safe distance and speed between a following vehicle and a preceding vehicle, for example, by, at the following vehicle, calculating the speed of the preceding vehicle, the speed of the following vehicle, and the distance between the following vehicle and the preceding vehicle. Again, such calculations are performed using one or more onboard sensors and/or cameras, as well as an onboard and/or cloud-based processing system. The present disclosure supplements these calculations by utilizing information, such as a detected road friction at the following vehicle and a predicted road friction by the following vehicle. The predicted road friction may be based on local observations and/or cloud-based observations obtained from other vehicles. The detected road friction between the following vehicle tires and the road surface may be assessed using a variety of methodologies and is used to compute a critical safety distance between the following vehicle and the preceding vehicle and a critical safety speed of the following vehicle. The predicted road friction ahead of the following vehicle may also be assessed using a variety of methodologies (lidar, camera, and cloud-based examples are provided) and is used to compute a warning safety distance between the following vehicle and the preceding vehicle and a warning safety speed of the following vehicle. These functionalities may of course be applied to vehicle/stationary object warning and response scenarios and the like as well.

Thus, while most conventional systems and methods rely on longitudinal velocity control mechanisms for the initiation of vehicle throttle and braking controls in detected scenarios, the present disclosure utilizes ML models to detect the road friction or road surface condition beneath a vehicle and predict the road friction or road surface condition ahead of a vehicle—thereby improving vehicle warning and response systems related to other vehicles, obstacles, and the like. The result is increased accuracy of and confidence in determined critical and warning safety distances and speeds.

Figure 1:
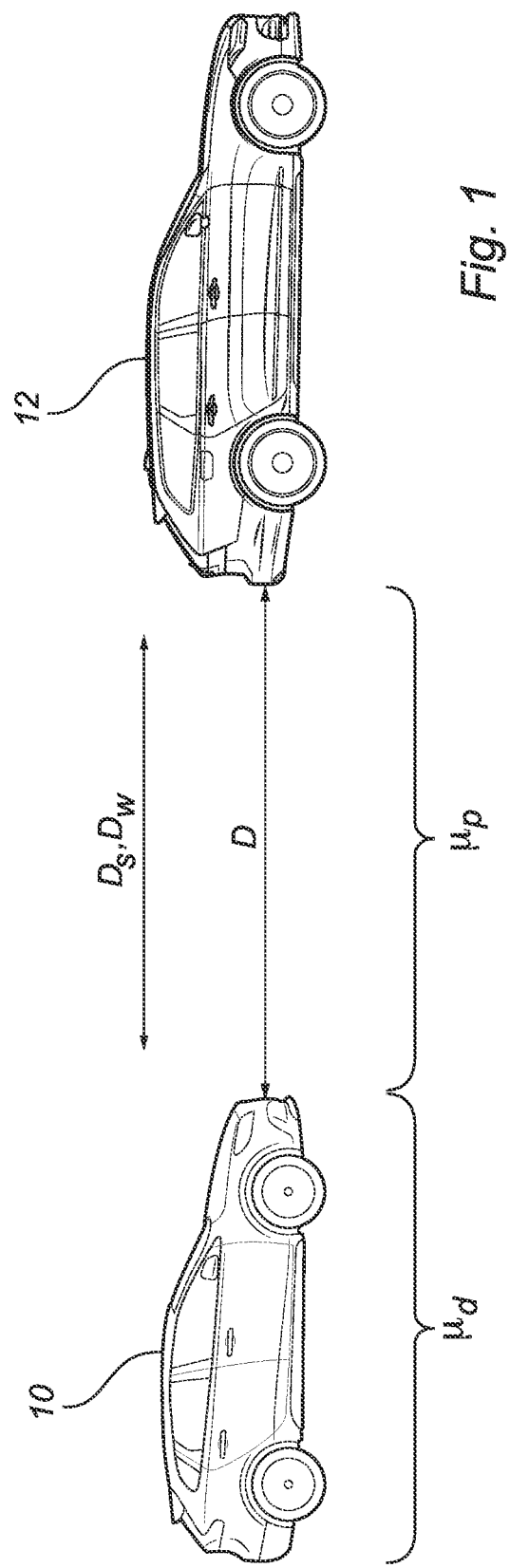
FIG. 1 is a schematic diagram illustrating the various distances and road frictions considered by the system and method of the present disclosure.

Referring now specifically to FIG. 1, in one exemplary embodiment, the various distances and road frictions considered by the system and method of the present disclosure include:

- $\mu_d$ (detected friction)—the detected friction coincident with the ego vehicle 10 based on ML modeling using onboard sensors;
- $\mu_p$ (predicted friction)—the predicted friction ahead of the ego vehicle 10 based on ML modeling using vision/perception sensors;
- d (distance)—the distance between the ego vehicle 10 and a preceding vehicle 12 or other object (moving or stationary);
- $D_s$ (critical safety distance)—the critical required stopping distance for the ego vehicle 10 in view of the detected friction and predicted friction as calculated by the collision avoidance or ACC module, $D_s = v^2/(2*g*f(\mu_d, \mu_p))$, where g is the gravitational constant;
- $D_w$ (warning safety distance)—the warning required stopping distance for the ego vehicle 10 in view of the predicted friction as calculated by the collision avoidance or ACC module, $D_w = v^2/(2*a*f(\mu_p))$, where a is maximum acceleration/deceleration of the ego vehicle;
- v (velocity)—the velocity of the ego vehicle 10; and
- $V_{ds}$ (desired velocity)—the recommended velocity to maintain the critical safety distance between the ego vehicle 10 and a preceding vehicle 12 or other object (moving or stationary).

Figure 2:
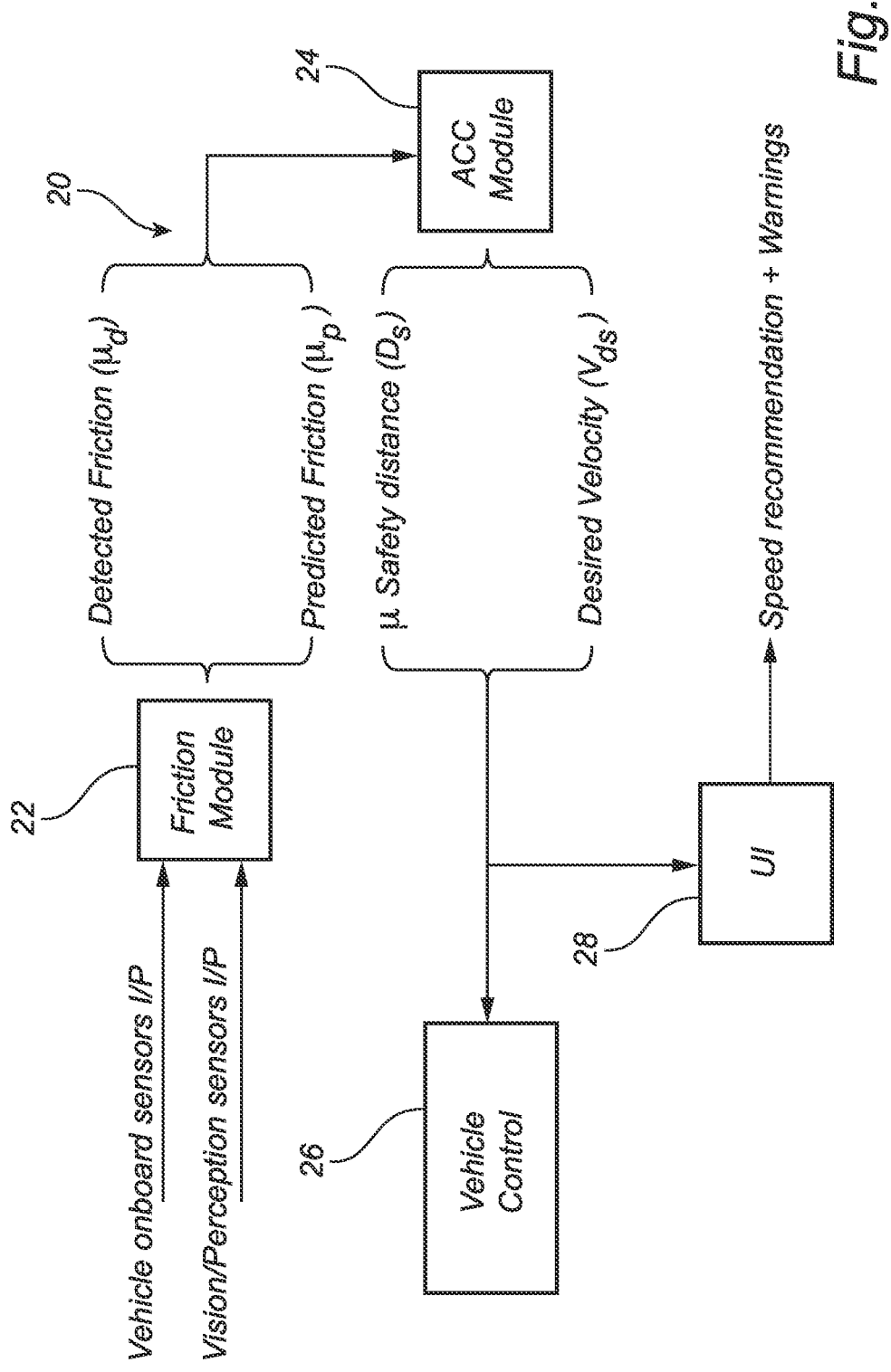
FIG. 2 is a schematic diagram illustrating one exemplary embodiment of the system and method of the present disclosure implemented in a closed-loop, ACC context.

Referring now specifically to FIG. 2, in one exemplary embodiment, the ACC system 20 of the present disclosure includes a friction module 22 that is configured to receive detected friction information from one or more vehicle onboard sensors and predicted friction information from one or more vision or perception sensors and calculate the detected friction under the ego vehicle 10 (FIG. 1) and the predicted friction ahead of the ego vehicle 10. The detected friction and predicted friction are fed into the ACC module 24, which calculated the critical safety distance under current conditions, as well as the desired velocity necessary to maintain this critical safety distance. This information is then relayed to the vehicle control system 26, which can maintain the desired velocity and critical safety distance via the ACC or PA functionality. Here, the implementation is a closed-loop one, to be distinguished from a collision avoidance scenario, for example. In addition to vehicle control, warnings and speed recommendations may be issued to a driver via a user interface (UI) 28 in the vehicle to ensure that the desired velocity and critical safety distance under current conditions are maintained.

Figure 3:
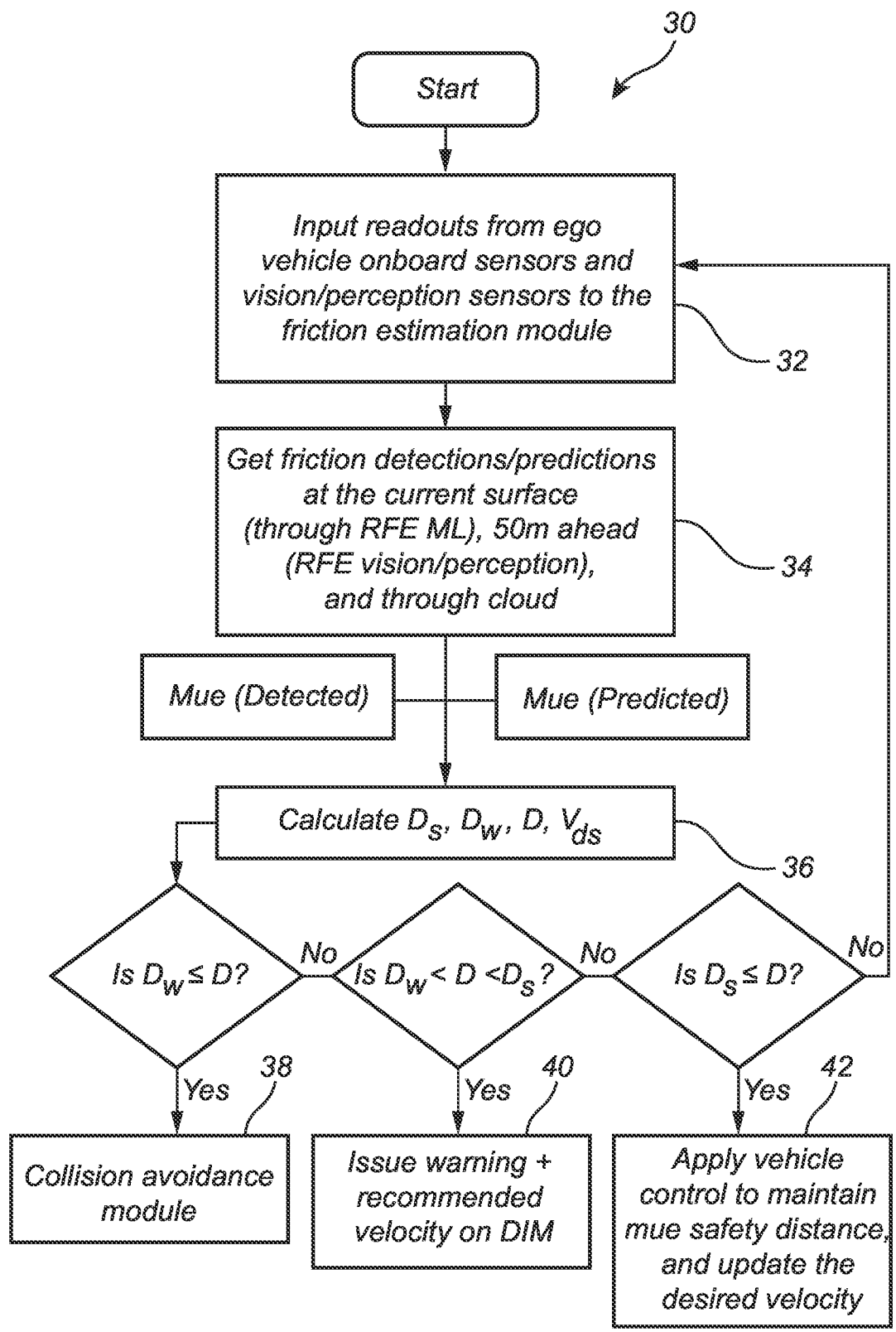
FIG. 3 is a schematic diagram illustrating another exemplary embodiment of the system and method of the present disclosure implemented in an open-loop, ACC and collision avoidance context.

Referring now specifically to FIG. 3, in another exemplary embodiment, the open-loop method 30 of the present disclosure includes first inputting readouts from the ego vehicle's onboard sensors and vision/perception sensors to the friction module 22 (FIG. 2) 32. Next, the predicted friction ahead of the ego vehicle is calculated and, optionally, predicted friction data is obtained from the cloud based on observations from other vehicles 34. From the detected and predicted friction values, D, $D_s$, $D_w$, and $V_{ds}$ are calculated 36. Subsequently, if $D_w \leq D$, then the CAM is activated and utilized to control the vehicle 38. If $D_w < D < D_s$, then a driver warning is issued and the recommended velocity is provide to the driver via the driver information module (DIM) 40. If $D_s \leq D$, then vehicle control is applied to maintain the safety distance and update the desired velocity.

Figure 4:
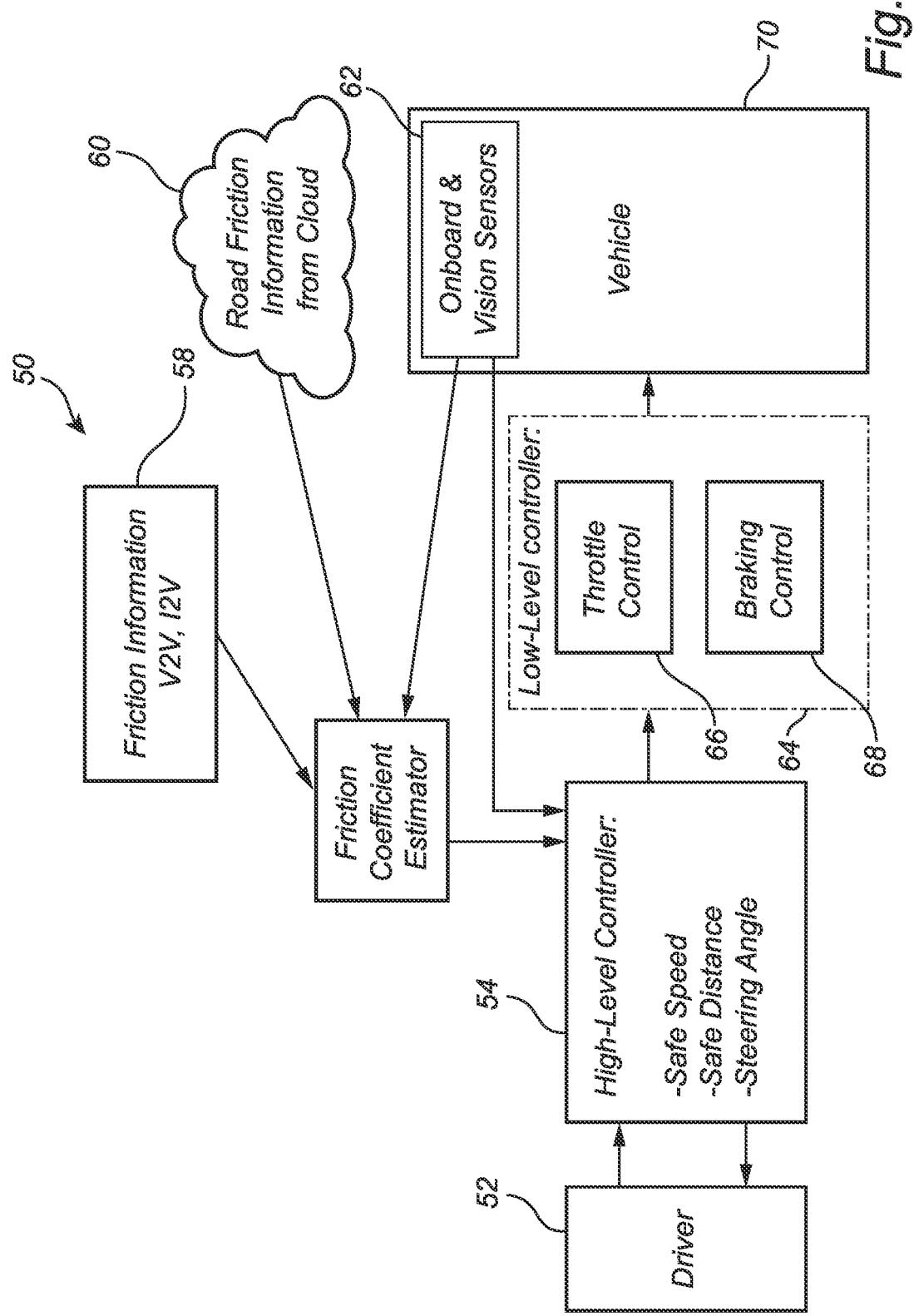
FIG. 4 is a schematic diagram illustrating a further exemplary embodiment of the system and method of the present disclosure.

Referring now specifically to FIG. 4, in a further exemplary embodiment, the system 50 of the present disclosure is utilized by a driver 52 that selectively operates a vehicle 70. Specifically, the driver 52 interacts with a high-level controller 54 through various vehicle controls. The high-level controller 54 is operable for maintaining a safe speed for the vehicle 70, a safe distance for the vehicle 70 (with respect to adjacent vehicles and objects), controlling the vehicle's steering angle, etc. Here, the high-level controller 54 is coupled to or includes a friction coefficient estimator 56 that is operable for formulating both detected and predicted friction values using road friction information obtained from other vehicles (V2V) and the infrastructure (I2V) 58, road friction information from the cloud 60, and/or road friction information from onboard and/or vision/perception sensors 62. The high-level controller 54 ultimately affects operation of the vehicle 70 in view of detected and predicted road friction conditions and calculated distances and velocities through a low-level controller 64 that incorporates a throttle control 66, a braking control 68, etc.

The safety system of the present disclosure assists a driver in keeping a safe gap from a preceding vehicle. If the gap becomes shorter than desired, the driver is presented with an alert in the DIM and/or a heads-up display (HUD). Conventionally, this safety distance is calculated assuming consistent non-slippery road conditions. Thus, the safety distance is violated under slippery road conditions. The new safety distance is estimated by the present road condition prediction module that, in part, informs the safety distance calculation.

Figure 5:
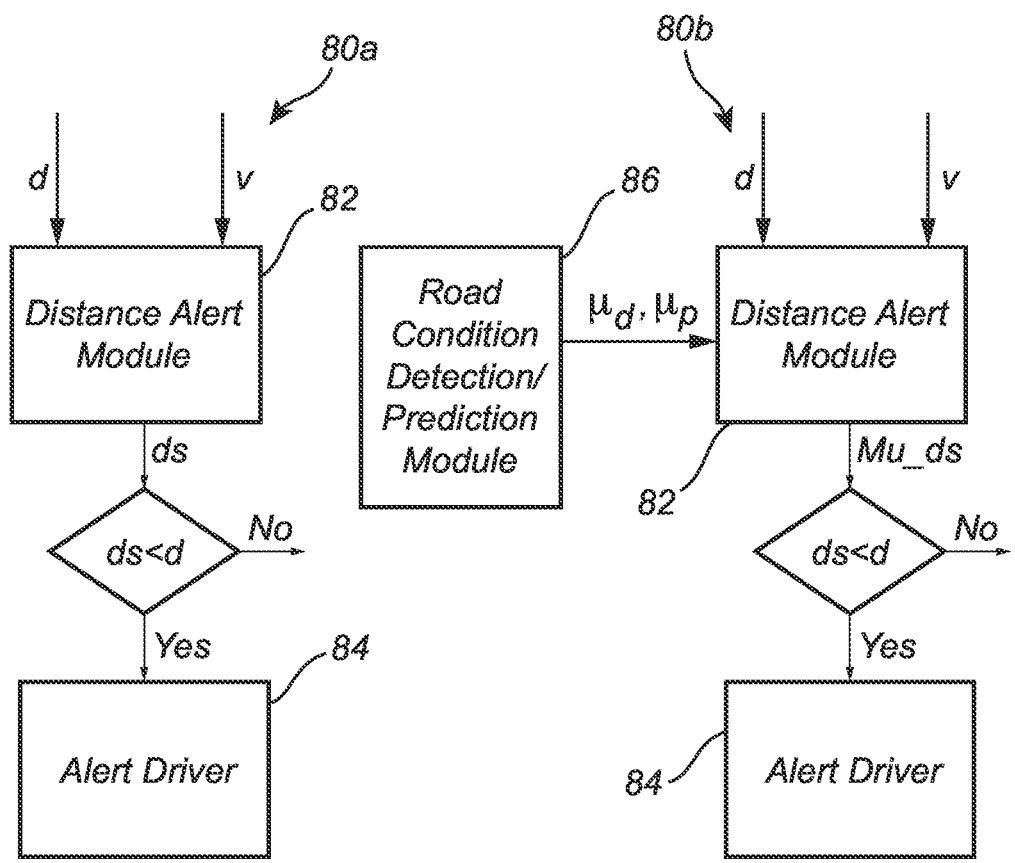
FIG. 5 is a schematic diagram illustrating both conventional and proposed systems and flows for alerting a driver to the violation of a determined safety distance without and with the consideration of road surface condition, respectively.

FIG. 5 is a schematic diagram illustrating both conventional 80a and proposed 80b systems and flows for alerting a driver to the violation of a determined safety distance without and with the consideration of road surface condition, respectively. In the conventional case 80a, the distance alert module 82 compares the measured distance between the ego vehicle and another vehicle or object and, if $D_s > D$, a driver alert 84 is issued, which may be visual, audible, and/or haptic. In the proposed case 80b, the distance alert module 82 compares the measured distance between the ego vehicle and another vehicle or object taking into account both the detected road friction and the predicted road friction and, if $D_{ds} > D$, a driver alert 84 is issued, which again may be visual, audible, and/or haptic. Here, the detected and predicted road friction values are obtained from the road condition detection/prediction module 86. As will be appreciated by persons of ordinary skill in the art, slippery road conditions can greatly increase the stopping distance of a vehicle, and therefore the determined safety distance. Thus, although road slipperiness information is often available from the cloud and general condition alerts may be issued to a driver, such information is not determined locally and/or incorporated into a safety distance algorithm that is used to issue driver alerts and/or modify the behavior of ADAS/AD systems, increasing safety margins, selectively disabling AD functionalities, etc.

Figure 6:
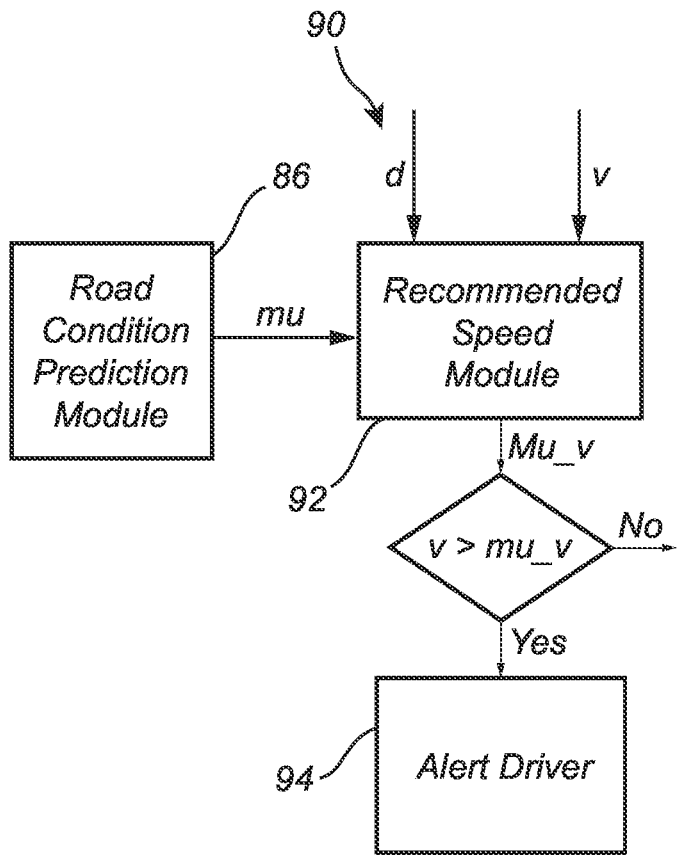
FIG. 6 is a schematic diagram illustrating the proposed system and flow for alerting a driver to the violation of a determined safety velocity with the consideration of road surface condition.

FIG. 6 is a schematic diagram illustrating the proposed system and flow 90 for alerting a driver to the violation of a determined safety velocity with the consideration of road surface condition. In the proposed case 90, the recommended speed module 92 computes and compares the measured velocity of the ego vehicle and another vehicle or object taking into account both the detected road friction and the predicted road friction and, if $V > V_{ds}$, a driver alert 94 is issued, which again may be visual, audible, and/or haptic. Here, the detected and predicted road friction values are obtained from the road condition detection/prediction module 86. Preferably, the recommended speed under a given set of road conditions is also displayed to the driver in the form of a speed icon. Both the recommended safety distance and speed can be used to adjust the ACC of the vehicle, providing more conservative settings under slippery road conditions, as well as AP and AD routines.

It will be readily apparent to persons of ordinary skill in the art that multiple systems and methodologies may be used to estimate the friction and road surface condition (RSC) present beneath a vehicle. For example, onboard vehicle sensors may be used to detect wheel slippage and observe the road surface itself.

U.S. Ser. No. 15/969,973 provides exemplary methods and systems for generating and utilizing a road friction estimate (RFE) that may be used in conjunction with the present disclosure, indicating the expected friction level between a road surface and the tires of a vehicle based on forward looking camera images and signal processing. A forward-looking camera image is pre-processed, patch segmented (both laterally and longitudinally, as defined by wheel tracks or the like), transformed into a bird's-eye-view (BEV) image to provide easy-to-process patches of the drivable surface ahead of the vehicle, patch quantized, and finally classified for RFE. The resulting RFE may be used to provide driver information, automatically control the associated vehicle's motion, and/or inform a cloud-based alert service to enhance driver safety, as provided herein. This RFE inherently includes a temporal component that alerts a driver and/or causes a vehicular response to hazardous driving conditions prior to such conditions being encountered by the vehicle and driver. This provides predictive leverage. The methods and systems may be integrated with the operation of other conventional on-vehicle sensors and systems, such as those providing braking/acceleration, lateral/longitudinal movement, and/or torque control. The methods and systems have improved accuracy, increased availability (even when pronounced tire forces are not present), and enhanced predictive ability, while operating efficiently with relatively low computational complexities as compared to existing image-based RSC classification models.

In one exemplary embodiment, the RFE generation method includes the following steps, each of which is executed by a processor, such as an on-vehicle electronic control unit (ECU) or the like: pre-processing, patch segmentation, BEV transformation, patch quantization, and classification. These steps each operate on an image that is preferably obtained from an on-vehicle forward looking camera or the like that has visibility for a given distance in front of a vehicle, for example 50 m.

The image is first pre-processed. In this pre-processing step, the image is broadly classified into a dry/wet/snow/slush/etc. RSC classification may be performed using any novel or conventional methodology known to persons of ordinary skill in the art. For example, the image may be classified into a given RSC using a ML/deep learning (DL) or neural network (NN) methodology that analyzes color/texture differences between a road surface, the sky, and the surrounding environment. This helps to remove selected images from further RFE processing. For example, if the image can be immediately classified as "dry," then further patch segmentation, quantization, and classification is not required as all patches are homogeneous and represent a high RFE. An image that is not immediately classifiable as "dry" with a predetermined degree of confidence, for example, advances to further RFE processing.

The pre-processed image is next patch segmented. In this patch segmentation step, the image, and specifically the road surface depicted in the image, is divided into discrete regions via lateral (i.e., horizontal) lines and longitudinal (i.e., vertical) lines, forming an m×n patch matrix over the road surface. Because the image is obtained from a forward-looking camera, it is a perspective image with a vanishing point. Accordingly, the lateral lines are substantially parallel, while the longitudinal lines generally converge with distance from the camera. In this exemplary embodiment, a 5×3 patch matrix is used, although it will be readily apparent to persons of ordinary skill in the art that other numbers of patches (columns and rows) may be used equally. In this 5×3 patch matrix, columns are configured to substantially correspond to and encompass the wheel tracks depicted, while a column is configured to be substantially between the wheel tracks. It is important, although not absolutely required, that enough rows are utilized to provide a temporal dimension to the generated RFE, with the image depicting and sufficiently analyzing enough road surface that the vehicle has yet to encounter. Again, at least a 3×2 patch matrix is preferred, with each patch covering 1-2 m laterally and 10-15 m longitudinally, for example—providing adequate and variable road surface coverage and the aforementioned temporal dimension. Different camera fields-of-view, resolutions, and calibrations could dictate/allow for other dimensions to be utilized equally. Typically, the 5×3 patch matrix provides 30-50 m of RFE distance. It should be noted that the image may be a stitched image obtained from multiple cameras without substantially altering the processing steps described herein.

The pre-processed, patch segmented image is next perspective transformed. In this perspective transformation step, the image, and specifically the road surface depicted in the image, already divided into discrete regions via lateral (i.e., horizontal) lines and longitudinal (i.e., vertical) lines, forming an m×n patch matrix over the road surface, is converted into an overhead, BEV image. Because the image is originally obtained from a forward-looking camera, it is a perspective image with a vanishing point. Accordingly, the lateral lines are substantially parallel, while the longitudinal lines generally converge with distance from the camera. As a result, pixel contributions proximate to the camera in the image are enhanced, while pixel contributions remote from the camera in the image are diminished. In the BEV transformed image, both the lateral lines and the longitudinal lines are substantially parallel, and perpendicular to one another. This promotes processing efficiency and equalizes pixel contributions. Again, in this exemplary embodiment, a 5×3 patch matrix is used, although it will be readily apparent to persons of ordinary skill in the art that other numbers of patches (columns and rows) may be used equally. In this now "rectified" 5×3 patch matrix, columns are still configured to substantially correspond to and encompass the wheel tracks, while a column is still configured to be substantially between the wheel tracks. Again, it is important, although not absolutely required, that enough rows are utilized to provide a temporal dimension to the generated RFE, with the BEV transformed image depicting and sufficiently analyzing enough road surface that the vehicle has yet to encounter. Again, at least a 3×2 patch matrix is preferred, with each patch covering 1-2 m laterally and 10-15 m longitudinally, for example—providing adequate and variable road surface coverage and the aforementioned temporal dimension. Different camera fields-of-view, resolutions, and calibrations could dictate/allow for other dimensions to be utilized equally. Typically, the 5×3 patch matrix provides 30-50 m of RFE distance. It should be noted that the BEV transformed image may be a stitched image obtained from multiple cameras without substantially altering the processing steps described herein. In practice, the above patch segmentation may be applied before or after the BEV transformation, provided the same image hallmarks (e.g., the wheel tracks) are used.

The pre-processed, patch segmented, BEV transformed image is next patch quantized. In this patch quantization step, a probability score is determined for each patch and then each probability score is assigned one of a predetermined number of corresponding levels. The probability score is determined for each patch by extracting a plurality (e.g., 26) color and textural features from that patch. Exemplary color and textural features include, but are not limited to, the mean and standard deviation of pixel intensities in the [R,G,B,H,S,V] planes with and without contrast enhancement and the mean and standard deviation of the HOG features extracted using a [16×16] block size, for example. Such methodologies are well known to persons of ordinary skill in the art. This probability score determination outputs a probability score ($p\_i$) corresponding to the per-patch composition. A low probability score indicates a "dry" patch, while a high probability score indicates a "snowy" patch. Many methodologies could be used to generate these probability scores, such as a ML/DL methodology, a logistic regression methodology, a neural network (NN) methodology, etc. Next, the probability scores are each assigned one of a predetermined number of corresponding levels (e.g., 4) based on thresholds $\{0, th1, th2, th3, 1\}$ that can be empirically or experimentally determined. For example:

si=
1; $0 \leq pi \leq th1$; =>dry;
2; $th1 \leq pi \leq th2$; =>more dry, less snow;
3; $th2 \leq pi \leq th3$; =>more snow, less dry;
4; $th3 \leq pi \leq 1$; =>snow;

Thus, a lower probability score means a less snowy and drier patch in this construct. An "ice" patch would be identified as si=[2,3]. These patch quantization thresholds are empirically determined to maximize patch classification accuracy. Averages may also be computed for groups of patches, such as each column. A weighted average, mean, median, or the like could also be used to provide temporal distribution information, enabled by the use of multiple rows. It will be readily apparent to persons of ordinary skill in the art that other classification schemes may be used equally.

Now that each patch has a classified probability score, a classification step, such as a rule-based classification step, for example, is utilized in which a uniform friction value, the RFE, is formulated for the entire road surface depicted in the pre-processed, patch segmented, BEV transformed, patch quantized image. One exemplary rule, when rules are used, is based on calculating the weighted of all columns of the matrix. For example, the uniform friction, $RFE_i$, =2 (i.e., high MUE) if the count of column average probability<=th1 is greater than 2. $RFE_i$, =1 (i.e., medium MUE) if the count of column average probability<=th2 and >th1 is greater than 2. $RFE_i$, =0 (i.e., low MUE) otherwise. It will be readily apparent to persons of ordinary skill in the art that any classification methodology can be utilized equally, and all threshold values can be learned from larger training images/image sets using decision tree-based models and the like.

It should further be noted that, given a forward-looking camera in a vehicle, not every image frame has to be processed to obtain an accurate and useful RFE. For example, with a logging frame rate of about 30 frames per second, image frames may be processed every 3 or 4 seconds. This promotes processing efficiency. Further, patches may be adaptive, adjusting to changing road surface sizes, orientations, and conditions. Importantly, the RFEs generated should be suitable use for vehicle control systems and cloud uploading once generated.

In one exemplary embodiment, the system for generating the RFE includes the forward-looking camera described herein above, well known to persons of ordinary skill in the art. The forward-looking camera image is transmitted from the forward-looking camera to the ECU of the vehicle, where the above describe processing of the forward-looking camera image takes place. This ECU includes appropriate memory and a processor operable for executing the software application of the present disclosure. The ECU communicates with and coordinates the operation of the VC, which controls the driver alert, cloud reporting, and system actuation functions of the vehicle. For example, a low RFE condition may, in general, trigger a "slippery road ahead" warning to a driver through a human-machine interface (HMI), such as a display screen disposed in the vehicle. A low RFE condition may also cause a "slippery road condition" to be tagged in the cloud, such that this information is available to other drivers/vehicles in the area. Finally, a low RFE condition may be communicated to other conventional on-vehicle sensors and control systems/actuators, such as those providing braking/acceleration, lateral/longitudinal movement, and/or torque control. This may then provide a ADAS or AD functionality. For example, the low RFE condition may trigger automatic braking/deceleration such that a safe driving speed is maintained for the conditions present, as provided herein.

U.S. Ser. No. 16/541,264 also provides exemplary systems and methods utilizing lidar data for road condition estimation that may be used in conjunction with the present disclosure, segmenting the road surface ahead of a vehicle into M×N patches and, optionally, BEV transform this construct. For each segment, x, y, z, and r are then determined—taking full advantage of position, accumulation height, and reflectance information to aid motion control and path planning for AD, as well as ADAS, modalities. The lidar point clouds are utilized with the M×N patches, as opposed to simply clustering the road surface based on absolute r indices, as relative variations in r are observed for the same road surface and the associated deterministic values are not always consistent. Thus, if there is a uniform pitch of black road surface ahead, ideally all points would have the same r index, but this is not the practical case, as the distance from the lidar sensor, light scattering, and variations in scanning patterns all have significant impacts. The context of r is learnable, but not always the values, so clustering based on r index is unreliable and non-generalizable. Accordingly, the M×N patches on the road surface are designed to find patterns on the road surface that should have been clustered if r was a reliable and repeatable entity.

Given a front-facing camera image and a corresponding lidar point cloud 16, highlighting z and r indices, the ground plane or drivable surface, as well as objects with larger z values, can be found. A BEV lidar point cloud can show a ground plane or drivable surface and z values as intensity, or show a ground plane or drivable surface and r values as intensity. Features that have a different z and r than the surrounding road surface can be discriminated. A 3-D surface plot of the BEV lidar point cloud can highlight the same features. The r metrics vary with respect to distance from the lidar sensor. The pattern changes across sharp edges, but the r values are not consistent across the surface. The z values are more consistent across the surface. Thus, surface-level clustering using r may be feasible for short distances but is not scalable/generalizable. Thus, a patch scheme utilizing both z and r is preferable. The scaling of r by the distance, x, from the lidar sensor improves relative surface classification performance.

Patches on the road surface are used to generate pseudo-clusters to estimate slipperiness, p, per patch, proving an indication of safety to proceed, allowing for path planning, etc. The relative position of a given ground patch (x, y), ground height (z), and scaled reflectance (r/x or $r/x^2$, depending on the lidar specifications) are thus used for patch classification in terms of slipperiness probability (p). This provides for a robust discrimination between a ground plane or drivable surface, objects, different surfaces, and the road condition.

In one exemplary embodiment, the road condition estimation system is implemented largely in software executed by a processor resident in a vehicle and/or the cloud. The road condition estimation system includes a lidar sensor that is coupled to the vehicle and is operable for obtaining a lidar point cloud that is utilized by the road condition estimation system. This lidar sensor may be disposed at a position on the vehicle that is significantly above the ground plane and road surface, such that the lidar sensor is provided with a clear line of sight in front of the vehicle. Advantageously, the lidar sensor is minimally impacted by many visibility conditions that would significantly impact a comparable front-facing camera. The lidar point cloud data includes four fields per reflected signal point, x, y, z, and r, with x, y, z corresponding to the 3-D location of the given objects/surfaces with respect to the lidar sensor, z specifically corresponding to the height of a reflected object/surface, and r referring to the associated reflectance index, which is different for different surfaces and surface coverings. The road condition estimation method begins with the road condition estimation algorithm detecting the ground plane or drivable surface in the lidar point cloud. This can be done using an unsupervised iterative algorithm, or a supervised ML/DL algorithm. Subsequently, the M×N matrix is superimposed on the drivable surface ahead of the vehicle in the lidar point cloud. By way of example only, the M×N matrix may be a 5×3 matrix, with columns disposed along each expected wheel path, a column disposed between the expected wheel paths, and columns disposed outside of the expected wheel paths. Optionally, the M×N matrix extends at least 70-100 m ahead of the vehicle on the ground plane or drivable surface, such that the predictive capability of the road condition estimation system is maximized. Subsequently, each patch of the M×N matrix is statistically evaluated to determine relative position (x, y), feature elevation (z), and scaled reflectance (r/x or $r/x^2$, depending on the lidar specifications). The statistical features extracted from each patch may include average, standard deviation, distribution of relative position (x, y), height, and scaled reflectance metrics within the patch. Subsequently, each road patch is classified to indicate the extent of roughness or slipperiness. Thus, a probabilistic determination is made for each road patch related to ice/snow/slush/water/etc. and road condition for the drivable surface is estimated.

Based on the predicted slipperiness index, p, for each patch and the overall matrix, alarms can generally be raised, ADAS functionalities can be implemented, and/or an active AD mode can be disabled by the vehicle control system, for example. Alternatively or in addition, the predicted slipperiness indices, p, ahead of the vehicle can be formatted and displayed visually to a driver of the vehicle and or fed into the AD function to allow for enhanced vehicle motion and trajectory planning. Alternatively or in addition, as the vehicle moves and more lidar frames are acquired, the relative positions of road patches can be converted to global coordinate positions and the slipperiness probability updated for each global coordinate position with each new lidar frame. The same patch on the road surface may be visible in multiple lidar frames, and updating the associated slipperiness probability with respect to global coordinate positions may thus optimize path planning information. All data, of course, may be transmitted to the cloud for use by other vehicles as well.

The lidar perception sensor utilized here provides the capability to extend vision over camera images to instances with low standing sun, poor lighting, and night-time vision conditions. The framework provided segments the ground plane lidar point cloud into several segments and applies statistical features within the ground plane or drivable surface patches to describe a complete road condition in front of the vehicle. Based on the segmented ground plane or drivable surface point clouds, a probability map of slipperiness underneath the vehicle wheels and in the nearby vicinity can be generated, which can be used to warn a driver, turn off AD mode (to ensure safety), and plan vehicle path/trajectory accordingly to minimize vehicle slippage or hydroplaning. As lidar frames continue to be acquired, the probability of slipperiness can be updated for global coordinates to allow for optimal vehicle control and path planning applications involving AD functionalities.

Further, the present disclosure may make use of U.S. Ser. No. 16/420,553, which provides a method for estimating a tire property of a vehicle based on tire-to-road friction properties for a fleet of vehicles. The method includes: determining a tire-to-road friction for plurality of vehicles at a plurality of specified locations; determining a reference tire-to-road friction for the fleet of vehicles at each of the plurality of specified locations; in a vehicle, determine a current tire-to-road friction at a first location being one of the plurality of specified locations as a weighted average of friction values determined at the respective specified location; determining a difference between the current tire-to-road friction and the reference tire-to-road friction of the fleet for the first location; and estimating a tire property of the vehicle based on the difference.

Still further, the present disclosure may make use of U.S. Ser. No. 16/006,241, which provides a system and method for utilizing aggregated weather data (AWD) for deriving road surface condition RSC estimates. This system and method supplements RFEs made at the vehicle level with AWD in the cloud to form the RSC estimates, which are then transmitted to the vehicles such that more accurate RFEs can be made locally, and so on. Conventional RFE physics-based models are replaced with enhanced RFE trained ML models accordingly. Global RSC estimates are derived for each geographical region using weather and location constraints. Thus, improved autonomous driving and driver assist functions may be implemented, better driver warnings may be provided, and safer road trips may be planned in advance based on a thorough analysis of the drivable conditions. This provides a strategy for effectively combining AWD with the RFEs from individual vehicles. ML algorithms indicate that road surface type is a significant factor for RFE determination. Thus, RSC is computed in the cloud for specific locations and this information is probed by individual vehicles to increase the accuracy and availability of the associated RFE determinations, utilizing optimal communication strategies. Thus, the present disclosure goes beyond RSC estimation for specific locations using statistical models, presenting a novel framework for combining RSC estimates and RFEs for the in-vehicle assessment of drivable conditions. Further, global positioning system (GPS) data and statistics are utilized in the cloud to predict RSC over time. Weather stations today merely estimate and predict the state of the sky. There is no existing apparatus to derive global RSC estimates for each geographical region using only weather and location constraints. However, the correlation between GPS coordinates, weather, and altitude can be used to estimate RSC and road friction, followed by the application of Markov models or the like to model the variation of a road surface over time. Additionally, road work vehicle schedules can be used to further enhance RSC estimation accuracy. Effectively, relevant ground and sky considerations are combined. This methodology enables the tagging of geographical regions with estimates and predictions for RSC and road slipperiness. Thus, drivers can select optimal routes in advance, not based only on distance and time, but also based on road safety indices.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Thus, again, various driver warning information and ACC and PA functions currently available promote the driver or vehicle maintenance of a safe distance and speed between a following vehicle and a preceding vehicle, for example, by, at the following vehicle, calculating the speed of the preceding vehicle, the speed of the following vehicle, and the distance between the following vehicle and the preceding vehicle. Again, such calculations are performed using one or more onboard sensors and/or cameras, as well as an onboard and/or cloud-based processing system. The present disclosure supplements these calculations by utilizing information, such as a detected road friction at the following vehicle and a predicted road friction by the following vehicle. The predicted road friction may be based on local observations and/or cloud-based observations obtained from other vehicles. The detected road friction between the following vehicle tires and the road surface may be assessed using a variety of methodologies and is used to compute a critical safety distance between the following vehicle and the preceding vehicle and a critical safety speed of the following vehicle. The predicted road friction ahead of the following vehicle may also be assessed using a variety of methodologies (lidar, camera, and cloud-based examples are provided) and is used to compute a warning safety distance between the following vehicle and the preceding vehicle and a warning safety speed of the following vehicle. These functionalities may of course be applied to vehicle/stationary object warning and response scenarios and the like as well.

Thus, while most conventional systems and methods rely on longitudinal velocity control mechanisms for the initiation of vehicle throttle and braking controls in detected scenarios, the present disclosure utilizes ML models to detect the road friction or road surface condition beneath a vehicle and predict the road friction or road surface condition ahead of a vehicle—thereby improving vehicle warning and response systems related to other vehicles, obstacles, and the like. The result is increased accuracy of and confidence in determined critical and warning safety distances and speeds.

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A system for determining and utilizing vehicle safety distance and speed information, comprising:
   a road condition module configured to receive and formulate detected road friction data from one or more on-board vehicle sensors related to detected road friction in the proximity of a vehicle and predicted road friction data from one or more vision/perception vehicle sensors related to predicted road friction ahead of the vehicle;
   a safety distance/speed module configured to determine a safety distance based on a determined function of the detected road friction and the predicted road friction, a safety speed, a warning distance based on a vehicle velocity, a maximum acceleration/deceleration of the vehicle, and a determined function of the predicted road friction, and a warning speed of the vehicle with respect to another vehicle or an object taking into account the detected road friction data and the predicted road friction data; and
   one or more of: (1) a driver alert system configured to present one or more of the safety distance, the safety speed, the warning distance, and the warning speed to a driver of the vehicle or alert the driver if the safety distance or the warning distance has been breached or the safety speed or the warning speed has been exceeded and (2) a vehicle control system configured to alter automated operation of the vehicle based on one or more of the safety distance, the safety speed, the warning distance, and the warning speed.

2. The system of claim 1, wherein the one or more on-board vehicle sensors comprise a sensor configured to detect wheel/road friction.

3. The system of claim 1, wherein the one or more vision/perception vehicle sensors comprise one or more of a camera sensor, a radar sensor, and a lidar sensor.

4. The system of claim 1, wherein the safety distance is determined using the following equation:

$$D_s = v^2/(2*g*f(\mu_d, \mu_p)),$$

where v is the vehicle velocity, g is the gravitational constant, $\mu_d$ is the detected road friction, and $\mu_p$ is the predicted road friction, with f being the determined function of the detected road friction and the predicted road friction.

5. The system of claim 4, wherein the safety speed is a maximum speed allowable to stop the vehicle within the determined safety distance.

6. The system of claim 1, wherein the warning distance is determined using the following equation:

$$D_w = v^2/(2*a*f(\mu_p)),$$

where v is the vehicle velocity, a is the maximum acceleration/deceleration of the vehicle, $\mu_p$ is the predicted road friction, with f being the determined function of the predicted road friction.

7. The system of claim 6, wherein the warning speed is a predetermined speed allowable to stop the vehicle within the determined safety distance with an incorporated safety margin.

8. The system of claim 1, wherein the vehicle control system is configured to alter automated operation of one or more of an adaptive cruise control system, an autopilot system, a collision avoidance system, and an autonomous driving system of the vehicle based on one or more of the safety distance, the safety speed, the warning distance, and the warning speed.

9. The system of claim 1, wherein the road condition module is further configured to receive and formulate road friction data obtained from one or more of another vehicle and a cloud network.

10. A method for determining and utilizing vehicle safety distance and speed information, comprising:
   receiving and formulating detected road friction data from one or more on-board vehicle sensors related to detected road friction in the proximity of a vehicle and predicted road friction data from one or more vision/perception vehicle sensors related to predicted road friction ahead of the vehicle;
   determining a safety distance based on a determined function of the detected road friction and the predicted road friction, a safety speed, a warning distance based on a vehicle velocity, a maximum acceleration/deceleration of the vehicle, and a determined function of the predicted road friction, and a warning speed of the vehicle with respect to another vehicle or an object taking into account the detected road friction data and the predicted road friction data; and one or more of: (1) presenting one or more of the safety distance, the safety speed, the warning distance, and the warning speed to a driver of the vehicle or alerting the driver if the safety distance or the warning distance has been breached or the safety speed or the warning speed has been exceeded and (2) altering automated operation of the vehicle based on one or more of the safety distance, the safety speed, the warning distance, and the warning speed.

11. The method of claim 10, wherein the one or more on-board vehicle sensors comprise a sensor configured to detect wheel/road friction.

12. The method of claim 10, wherein the one or more vision/perception vehicle sensors comprise one or more of a camera sensor, a radar sensor, and a lidar sensor.

13. The method of claim 10, wherein the safety distance is determined using the following equation:

$$D_s = v^2/(2*g*f(\mu_d,\mu_p)),$$

where v is the vehicle velocity, g is the gravitational constant, $\mu_d$ is the detected road friction, and $\mu_p$ is the predicted road friction, with f being the determined function of the detected road friction and the predicted road friction.

14. The method of claim 13, wherein the safety speed is a maximum speed allowable to stop the vehicle within the determined safety distance.

15. The method of claim 10, wherein the warning distance is determined using the following equation:

$$D_w = v^2/(2*a*f(\mu_p)),$$

where v is the vehicle velocity, a is the maximum acceleration/deceleration of the vehicle, $\mu_p$ is the predicted road friction, with f being the determined function of the predicted road friction.

16. The method of claim 15, wherein the warning speed is a predetermined speed allowable to stop the vehicle within the determined safety distance with an incorporated safety margin.

17. The method of claim 10, further comprising altering automated operation of one or more of an adaptive cruise control system, an autopilot system, a collision avoidance system, and an autonomous driving system of the vehicle based on one or more of the safety distance, the safety speed, the warning distance, and the warning speed.

18. The method of claim 10, further comprising receiving and formulating road friction data obtained from one or more of another vehicle and a cloud network.

19. A non-transitory computer-readable medium comprising instructions stored in a memory and executed by a processor for determining and utilizing vehicle safety distance and speed information, the instructions, when executed, performing the steps comprising:
receiving and formulating detected road friction data from one or more on-board vehicle sensors related to detected road friction in the proximity of a vehicle and predicted road friction data from one or more vision/perception vehicle sensors related to predicted road friction ahead of the vehicle;
determining a safety distance based on a determined function of the detected road friction and the predicted road friction, a safety speed, a warning distance based on a vehicle velocity, a maximum acceleration/deceleration of the vehicle, and a determined function of the predicted road friction, and a warning speed of the vehicle with respect to another vehicle or an object taking into account the detected road friction data and the predicted road friction data; and
one or more of: (1) presenting one or more of the safety distance, the safety speed, the warning distance, and the warning speed to a driver of the vehicle or alerting the driver if the safety distance or the warning distance has been breached or the safety speed or the warning speed has been exceeded and (2) altering automated operation of the vehicle based on one or more of the safety distance, the safety speed, the warning distance, and the warning speed.

20. The non-transitory computer-readable medium of claim 19, wherein the steps further comprise:
altering automated operation of one or more of an adaptive cruise control system, an autopilot system, a collision avoidance system, and an autonomous driving system of the vehicle based on one or more of the safety distance, the safety speed, the warning distance, and the warning speed; and
receiving and formulating road friction data obtained from one or more of another vehicle and a cloud network.

* * * * *